US011257041B2

(12) United States Patent
Larsen et al.

(10) Patent No.: US 11,257,041 B2
(45) Date of Patent: Feb. 22, 2022

(54) DETECTING DISABILITY AND ENSURING FAIRNESS IN AUTOMATED SCORING OF VIDEO INTERVIEWS

(71) Applicant: HireVue, Inc., South Jordan, UT (US)

(72) Inventors: Loren Larsen, Lindon, UT (US); Keith Warnick, Midvale, UT (US); Lindsey Zuloaga, Salt Lake City, UT (US); Caleb Rottman, Salt Lake City, UT (US)

(73) Assignee: HireVue, Inc., South Jordan, UT (US)

( * ) Notice: Subject to any disclaimer, the term of this patent is extended or adjusted under 35 U.S.C. 154(b) by 665 days.

(21) Appl. No.: 16/105,767

(22) Filed: Aug. 20, 2018

(65) Prior Publication Data
US 2019/0057356 A1 Feb. 21, 2019

Related U.S. Application Data

(60) Provisional application No. 62/548,193, filed on Aug. 21, 2017.

(51) Int. Cl.
G06Q 10/10 (2012.01)
G06K 9/00 (2006.01)
(Continued)

(52) U.S. Cl.
CPC ..... G06Q 10/1053 (2013.01); G06K 9/00355 (2013.01); G06K 9/00718 (2013.01);
(Continued)

(58) Field of Classification Search
CPC ........... G06Q 10/1053; G06K 9/00355; G06K 9/00718; G06K 9/00744; G06K 9/6257; G06K 9/6269; G06K 9/6271; G06K 9/66
See application file for complete search history.

(56) References Cited

U.S. PATENT DOCUMENTS 6,470,314 B1 * 10/2002 Dharanipragada ..... G10L 15/07
704/231
8,363,961 B1 * 1/2013 Avidan ................. G06K 9/6218
382/225

(Continued)

OTHER PUBLICATIONS

Ellyn Brecher et al., "The structured interview: Reducing biases toward applicants with physical disabilities", Employee Responsibilities and Rights Journal, Nov. 8, 2006, vol. 18, pp. 155-170. (Year: 2006).*

(Continued)

Primary Examiner — Sangeeta Bahl
Assistant Examiner — Joshua D Schneider
(74) Attorney, Agent, or Firm — Lowenstein Sandler LLP

(57) ABSTRACT

A processing device is to: identify, using digital interview data of interviewees captured during interviews, a subset of the interviewees that have a disability; label a first group of the interviewees as disabled and a second group of the interviewees as not disabled with reference to the disability; identify features from the digital interview data for the first group that correlate with the disability; formulate a digital fingerprint of the features that identifies how the first group differs from the second group with reference to the disability; map the digital fingerprint of the features onto a dataset of an interviewee belonging to the second group of the interviewees, to generate a mapped dataset; and determine, from the mapped dataset, effects of the digital fingerprint on a job performance score for the interviewee.

21 Claims, 9 Drawing Sheets

(51) Int. Cl.
　　　*G06K 9/66*　　　(2006.01)
　　　*G06K 9/62*　　　(2006.01)
(52) U.S. Cl.
　　　CPC ....... *G06K 9/00744* (2013.01); *G06K 9/6257* (2013.01); *G06K 9/6269* (2013.01); *G06K 9/6271* (2013.01); *G06K 9/66* (2013.01)

(56) References Cited

U.S. PATENT DOCUMENTS

| | | | | |
|---|---|---|---|---|
| 9,652,745 | B2* | 5/2017 | Taylor | G06Q 10/063112 |
| 10,521,824 | B1* | 12/2019 | Boshy | G06Q 30/0269 |
| 2006/0282306 | A1* | 12/2006 | Thissen-Roe | G06Q 10/06 705/7.14 |
| 2012/0078804 | A1* | 3/2012 | Scarborough | G06Q 30/08 705/321 |
| 2015/0262130 | A1* | 9/2015 | Taylor | G06F 16/24578 705/321 |
| 2016/0034554 | A1* | 2/2016 | Wang | G06K 9/00 707/737 |
| 2017/0195637 | A1* | 7/2017 | Kusens | G06T 7/0016 |
| 2019/0088366 | A1* | 3/2019 | Vaughan | G16H 50/20 |

OTHER PUBLICATIONS

Indre Zliobaite, "Measuring discrimination in algorithmic decision making", Mar. 24, 2017, Data Min Knowl Disc, vol. 31, pp. 1060-1089, (Year: 2017).*
Gatys, L. A., et al., "A Neural Algorithm of Artistic Style," arXiv:1508.06576v2, cs.CV, 16 pages, Sep. 2, 2015.

* cited by examiner

US 11,257,041 B2

DETECTING DISABILITY AND ENSURING FAIRNESS IN AUTOMATED SCORING OF VIDEO INTERVIEWS

RELATED APPLICATION

This application claims the benefit of U.S. Provisional Application No. 62/548,193, filed Aug. 21, 2017, the entire contents of which are incorporated herein by reference.

BACKGROUND

Finding and hiring employees is a task that impacts most modern businesses. An employer seeks to find employees that "fit" open positions. The processes associated with finding employees that fit well can be expensive and time consuming for an employer. Such processes may include evaluating numerous resumes and cover letters, telephone interviews with candidates, in-person interviews with candidates, drug testing, skill testing, sending rejection letters, offer negotiation, training new employees, etc. A single employee candidate may be very costly in terms of man-hours needed to evaluate and interact with the candidate before the candidate is hired.

Computers and computing systems may be used to automate some of these activities. For example, many businesses now have on-line recruiting tools that facilitate job postings, resume submissions, preliminary evaluations, etc. Additionally, some computing systems include functionality for allowing candidates to participate in "virtual" on-line interviews.

The job of interviewers and candidate reviewers is to determine if candidates are skilled and have the qualifications required for a particular job. In the process of doing this, they ideally compare and contrast the qualifications of candidates. Over the years there have been numerous documented instances in which candidates have been selected based on qualities or characteristics other than the skills and qualifications required for a particular job. In the Unites States and other jurisdictions across the world, when candidates are chosen on the basis of gender, race, religion, ethnicity, sexual orientation, disability, or other categories that are protected to some degree by law, penalties may be imposed on entities for such practices. The penalties may be financial and may also include requirements for monitoring of hiring practices to ensure violations are not repeated. Additionally, when candidates are selected based on non-work related characteristics, the best candidates for the position may be overlooked, such that the quality of an entity's workforce is compromised.

While efforts have been made in the past to avoid discriminatory practices in hiring based on disabilities, these efforts have not been satisfactory. At least one reason for this is that too much of the candidate review process is handled by human administrators and thus human bias creeps in, which results in an adverse impact in hiring a group of those with disabilities. Even if computer models are employed to at least partially automate the review process, biases may be integrated or trained within the model and thus fail to eradicate the biases that cause an adverse impact on candidates in the hiring process. More specifically, a computer model may be initially infected with human bias, and without revision or update, may keep perpetuating the human bias, making such models less accurate and less unbiased. Accordingly, existing computer-based technology has deficiencies in that computer models may include inaccuracies or deficiencies in the data and/or how the data is processed in order to avoid hiring discrimination against those with disabilities.

The subject matter claimed herein is not limited to embodiments that solve any disadvantages or that operate only in environments such as those described above. Rather, this background is only provided to illustrate one exemplary technology area where some embodiments described herein may be practiced. Namely, the present disclosure may also be applied in other societal determinations such as benefits determinations, zoning, credit, voting, and the like.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
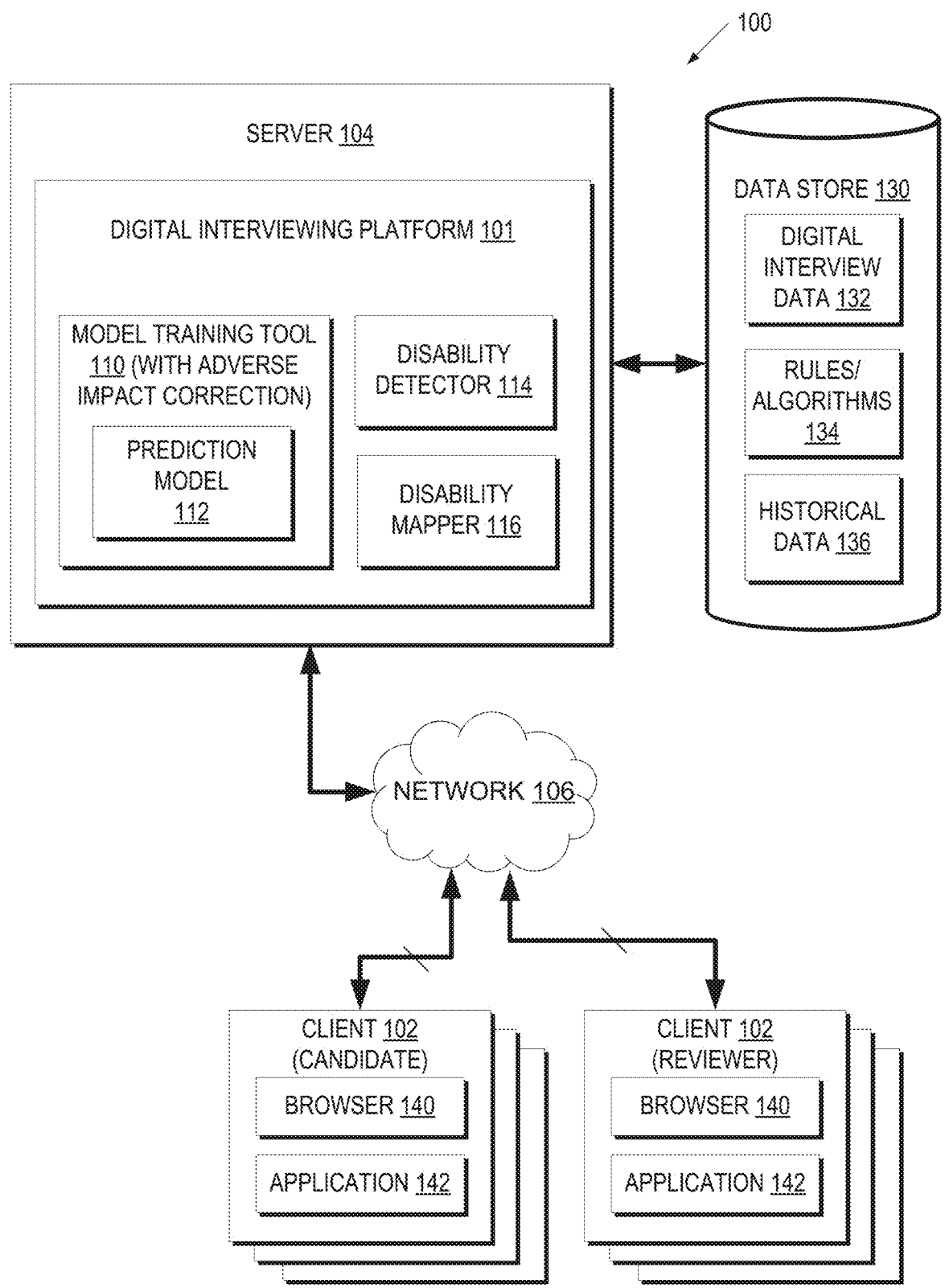
FIG. 1 is a block diagram of an exemplary network architecture in which embodiments of a model training tool may operate.

Methods and systems for correcting adverse impact in training a predictive performance model for candidate prediction are described. In the following description, numerous details are set forth. The predictive performance model may be used in digital interviewing platforms, as well as other digital evaluation platforms, to predict the likelihood of candidates being hired.

In one embodiment, a digital interviewing platform collects digital interview data. The data may include features, or model inputs. Examples of features include information submitted by the candidate, audio information recorded during a digital interview, visual information recorded during a digital interview, or other information relating to the candidate. The digital interview data may be processed by machines to extract characteristics of candidates. For example, machine-learning may be applied to audio and/or video information provided in the digital interview data to identify indicators of characteristics of a candidate, such as age, race, ethnicity, religion, gender, sexual orientation, disability, socio-economic status of the candidate or familial socio-economic status, citizenship status, association with institutions such as schools, charities, political organization, or the like. The digital interview data may also include data relating to a result of the interview. For example, the data may include whether or not the candidate was hired to the position, how the candidate performed in the position with regards to sales, funding, development, patents, hours, revenue, etc. This and other candidate-related data may be stored to a data store in computer storage or memory.

The model training tool may select a dataset including some or all of the digital interview data stored in the data store. Alternatively, the dataset may be stored in the data store according to hiring campaign or other organizational criteria. The model training tool may execute one or more algorithms to reduce adverse impact in the dataset. In some datasets, adverse impact may be introduced intentionally or unintentionally. For example, a decision-maker in the hiring process may introduce a personal bias into the hiring process by favoring graduates from one institution over another or based on other criteria or features of candidates within a candidate pool. Alternatively, the adverse impact may be introduced sub-consciously. Adverse impact may also be caused by flaws in a system, metrics used by a company in previous rounds of evaluations of candidates. This adverse impact may be difficult to detect and remove from a system and the effects may be difficult to counteract or correct. Moreover, the adverse impacts may affect many fields. For example, education (admissions and scholarship), housing, benefits and services, healthcare services, land use, zoning, lending and credit, transportation, voting, etc. The embodiments described herein help to correct adverse impacts in these and other situations.

In one embodiment, the model training tool may train a predictive model to predict performance metrics for new candidates. In order to correct adverse impact that may be present in the historical digital interview data used to train the model, the model training tool may execute an objective function to identify an error metric with a normalizing feature. The error metric represents a difference between an actual performance value of a candidate and a corresponding predicted performance value for the candidate. The actual performance value may also be referred to as a true performance value, or an actual performance metric. For example, during the hiring process a predicted value for sales may be generated by the predictive model. After hiring, and with sufficient data, an actual performance value for the candidate may be generated with regard to sales. The model training tool may determine the difference between the actual value and predicted value. The difference between the two may be applied to further train the model to improve the accuracy of subsequent predictions.

However, if adverse impact, caused by conscious or subconscious bias by an reviewer, was involved in the evaluation process, the adverse impact may be trained into the model if undetected. A majority of candidates may exist within the dataset which may control the error metric. In one example, if the majority of candidates are male, the datasets for the male candidates may then dominate the error metric. This may create an adverse impact against female candidates. For this reason, application of a normalizing process, such as a weighting factor algorithm, or removing features, is added to the process for determining the error metric. The normalizing process may normalize the effect of the data for each type or class of candidate so that each class has an equal effect on the model. This may reduce or eliminate adverse impact based on a class, such as age, gender, race, or the like, by giving each candidate class equal weight. Other classes, such as income-based, performance-based, and other categories defined or not defined by law, may be utilized. The resulting dataset may then be used to train the model for better accuracy in prediction without incorporating the adverse impact that may be present in the original dataset.

The training dataset used for training may include the selection of data that is used for the computer to learn which features are most correlative for predicting performance. Previous approaches could not incorporate a raw media stream (such as audio, video, or both) which may have over one million data points. Isolating a specific feature would be difficult if not impossible under previous approaches. Previous methods also did not address preventing adverse impact in more advanced unsupervised learning techniques such as deep learning.

The embodiments described herein may use machine-learning techniques to process the data. In particular, learning techniques such as deep learning are able to manage vast quantities of data points without relying on a traditional learning approach. The ability to handle larger datasets allows the modeling technique to use more features, as well as features which are more complex (as in the case of deep learning based on audio/image/video), while still mitigating adverse impact contributions. The techniques described herein also may prevent adverse impact when such an impact is present in training data as well as reduction of even minor adverse impacts. Further reduction of adverse impacts may lower detected impacts to levels already below applicable legal thresholds such as the "⅘ths rule," the "statistical significance rule," or tests such as the Fisher's exact test, the Z-Test for proportions, a chi-squared test, or the like.

In one embodiment, computer storage is provided to store digital interview data of interviewees captured during multiple interviews. A processing device is coupled to the computer storage and is adapted to identify, using the digital interview data, a subset of the interviewees that have a disability. The processing device may further label a first group of the interviewees as disabled and a second group of the interviewees as not disabled with reference to the disability. The processing device may further identify features from the digital interview data for the first group that correlate with the disability. The processing device may further formulate a digital fingerprint of the features that identifies how the first group differs from the second group with reference to the disability. These features may include action units unique to a disabled person, such as a combination of visual indicators, language indicators, and speech indicators, which will be discussed in more detail. The processing device may further extract the action units from the digital interview data.

In at least one embodiment, the processing device may further map the digital fingerprint (or action units, or feature identifiers) of the features onto a dataset of an interviewee belonging to the second group of the interviewees, to generate a mapped dataset. The processing logic may further quantify, via application of the predictive performance model to the mapped dataset, effects of the digital fingerprint on a job performance score for the interviewee. The processing logic may further determine that a difference in the job performance score, due the group of the features being mapped onto the dataset, results in an adverse impact. The processing logic may further update the predictive performance model by removing at least some of the group of the features that correlate with the disability, to reduce the adverse impact in application of the predictive performance model to review of the plurality of interviewees.

Accordingly, as a solution to the above mentioned technical problems to application of conventional computer models, the present disclosure illustrates a variety of technical solutions to particularly identify features that correlate with a disability, and to remove use of at least some of those features within a predictive performance model employed to review interviewees for job positions. These technical solutions employ a particular set of steps (which may be understood to list rules or algorithms) that remove the human bias involved when humans create or adapt models for interviewee assessment.

For example, features that a disabled person arguably demonstrates during an audio/video (A/V) interview may not all be related to the disability or cause an adverse impact in hiring practices that incorporate their consideration. To blindly remove them all or to selectively remove some of them after guessing the ones that have the greatest bias-based impact would be to incorporate human bias into the decision of how to update the model.

Accordingly, the instant disclosure explains how computer-based processing may objectively (to remove subjective bias of humans) determine how these features—determined from analysis of digital interview data of those determined to have the disability—may impact non-disabled interviewees that are imputed with the features by way of the digital fingerprint mapped to a dataset of an interviewee without the disability. By then determining a difference in score outcomes from before and after the digital fingerprint matching, the disclosed system may determine a subset of the features that not only cause an adverse impact, but which are the most strongly correlative with creating the bias that leads to the adverse impact. Even if the features as a group are considered to cause the adverse impact, by iteratively removing the features from the predictive performance model and updating analysis scores, the disclosed system may reduce the set of features that correlate to the disability in a way that reduces impact on the predictive power of the predictive performance model as a whole. This modification and updates to a predictive performance model may be performed without the taint of human bias that could creep in a human-based approach to model modification. Disclosed herein are the above noted and many other technical solutions that formulate the automation of modification to predictive performance models.

FIG. 1 is a block diagram of an example of a network architecture 100 in which embodiment of a model training tool 110 may operate. The illustrated network architecture 100 may include multiple client computing systems 102 coupled to a server computing system 104 via a network 106 (e.g., public network such as the Internet or private network such as a local area network (LAN)). The network 106 may include the Internet and network connections to the Internet. Alternatively, server 104 and the client 102 may be located on a common Local Area Network (LAN), Personal area network (PAN), Campus Area Network (CAN), Metropolitan area network (MAN), Wide area network (WAN), wireless local area network, cellular network, virtual local area network, or the like.

In various embodiments, the server computing system 104 (also referred to herein as server 104) may include one or more machines (e.g., one or more server computer systems, routers, gateways) that have processing and storage capabilities to provide the functionality described herein. The server computing system 104 may execute a model training tool 110. The model training tool 110 may perform various functions as described herein and may include a prediction model 112 for predicting values for candidates. The model training tool 110 may be implemented as a part of a digital interviewing platform 101, such as the digital interviewing platform developed by HireVue, Inc. Alternatively, the digital interview platform 101 may be other types of digital interview platforms. The digital interviewing platform 101 may further execute a disability detector 114 to detect whether certain interviewees have self-identified as disabled or otherwise include features correlative with a certain disability.

In various embodiments, the digital interviewing platform 101 may further include a disability mapper 116 with which to map certain features (or action units) that are correlative with a disability onto a dataset of a person known to not have the disability, for purposes of evaluating whether giving the non-disabled person those features would cause an adverse impact on the non-disabled person. With this knowledge, the digital interviewing platform 101 may then perform adverse impact mitigation with reference to the disability by iteratively removing problematic features from predictive interview models until the adverse impact is sufficiently mitigated, e.g., allows disabled persons to score about the 80% (or ⅘ths) mark when compared with those that are not disabled in the same way.

In other embodiments, the technology described herein may be used in other digital evaluation platforms or systems. In other embodiments, the model training tool 110 may be implemented as a standalone tool that interfaces with the digital interviewing platform 101 or other systems. It should also be noted that in this embodiment, the server computing system 104 implements the model training tool 110, but one or more of other clients may also include client modules of the model training tool 110 that may work in connection with, or independently from the functionality of the model training tool 110 on the server computing system 104. Furthermore, the disability detector 114 and the disability mapper 116 may be integrated as a sub-part of the model training tool 110 in other embodiments.

The client computing systems 102 (also referred to herein as "client 102") may be a client workstation, a server, a computer, a portable electronic device, an entertainment system configured to communicate over a network, such as a set-top box, a digital receiver, a digital television, a mobile phone, a smart phone, a tablet, or other electronic devices. For example, portable electronic devices may include, but are not limited to, cellular phones, portable gaming systems, portable computing devices or the like. The client 102 may have access to the Internet via a firewall, a router or other packet switching devices. The clients 102 may connect to the server 104 through one or more intervening devices, such as routers, gateways, or other devices. The clients 102 are variously configured with different functionality and may include a browser 140 and one or more applications 142. In one embodiment, the clients 102 accesses the digital interviewing platform 101 via the browser 140 and the digital interviewing platform 101 is a web-based application or a cloud computing system that presents user interfaces to the client 102 via the browser 140. Similarly, one of the applications 142 may be used to access the digital interviewing platform 101. For example, a mobile application (referred to as "app") may be used to access one or more user interfaces of the digital interviewing platform 101.

In various embodiments, the digital interviewing platform 101 may be one or more software products that facilitate the digital interview process. For example, in some cases, the client 102 is used by a candidate (or interviewee) to conduct a digital interview. The digital interviewing platform 101 may capture digital interview data 132 from the candidate and store the data in a data store 130. The digital interview data 132 may include information uploaded by the candidate, audio information captured during the interview, video information captured during the interview, game play data captured during gaming, information submitted by the candidate before or after the interview, and data collected for the candidate after hiring. For example, the candidate may submit a declaration of a disability in one embodiment, or alternatively, the digital interviewing platform 101 may identify features from the digital interview data 132 that correlate with the disability, and thereby determine that a particular candidate has the disability. The client 102 may also be used by a reviewer to review, screen and select candidates. The reviewer may access the digital interviewing platform 101 via the browser 140 or the application 142 as described above. The model training tool 110 may be activated by the reviewer (or automatically activated when enabled) to upload performance data for a candidate, train the prediction model 112 to sort candidates, for ordering a list of candidates using the prediction model 112, screening a list of candidates, or for other reviewing purposes, as described herein.

The data store 130 may represent one or more data repositories on one or more memory devices. The data store 130 may be a database or any other organized collection of data. The data store 130 may store the digital interview data 132, rules 134 to provide adverse impact correction (as described herein), and historical data 136.

In the depicted embodiment, the server computing system 104 may include the digital interviewing platform 101, including the model training tool 110 and prediction model 112 for reducing adverse impact in the digital interviewing platform 101. The server 104 may include web server functionality that facilitates communication between the clients 102 and the model training tool 110, as described herein. Alternatively, the web server functionality may be implemented on a separate machine than the machine executing the model training tool 110. It should also be noted that the functionality of the model training tool 110 may be implemented on one or more servers 104 and the functionality of the model training tool 110 may be implemented on one or more different servers 104. In other embodiments, the network architecture 100 may include other devices, such as directory servers, website servers, statistic servers, devices of a network infrastructure operator (e.g., an ISP), or the like. Alternatively, other configurations are possible as would be appreciated by one of ordinary skill in the art having the benefit of this disclosure.

Figure 2:
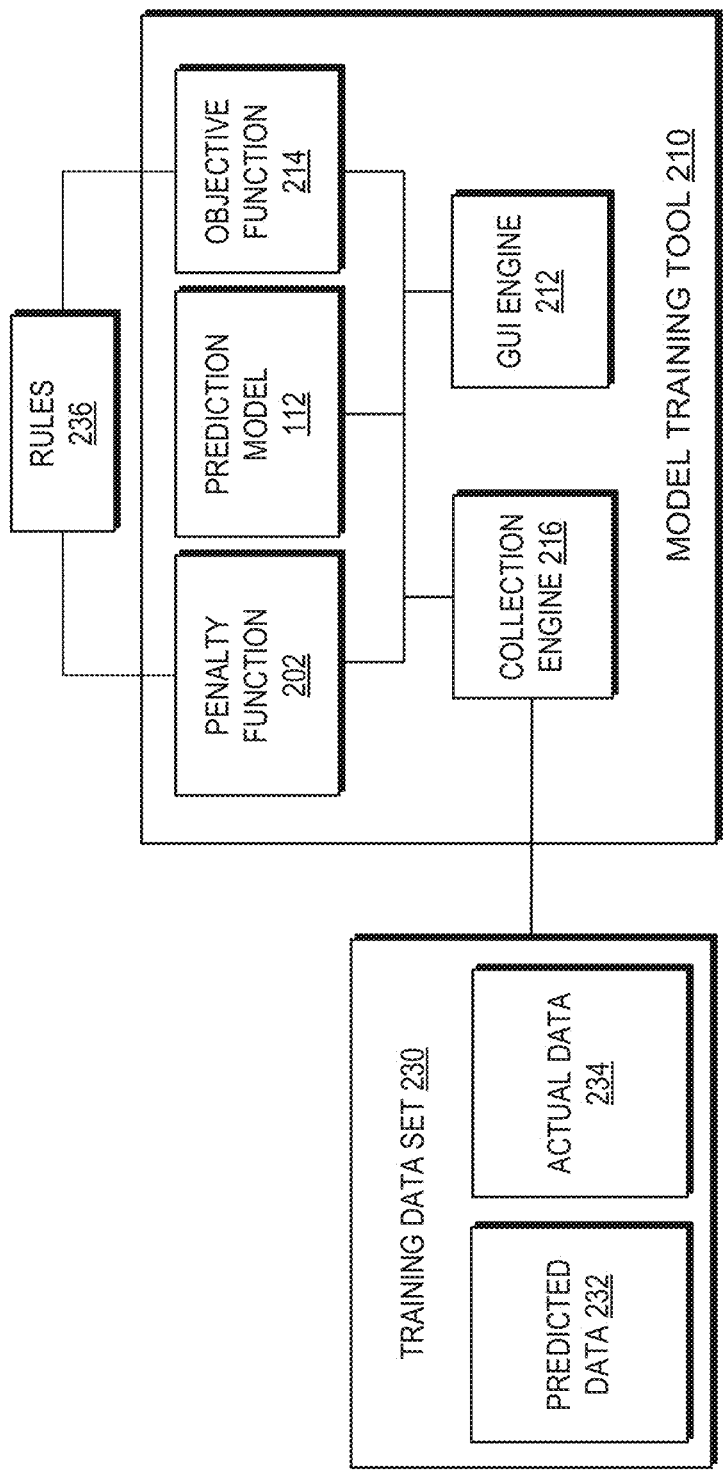
FIG. 2 is a block diagram of a model training tool according to one embodiment.

FIG. 2 is a block diagram of a model training tool 210 according to one embodiment. The model training tool 210 may be implemented as processing logic comprising hardware (circuitry, dedicated logic, etc.), software (such as is run on a general purpose computing system or a dedicated machine), firmware (embedded software), or a combination thereof. In the depicted embodiment, the model training tool 210 includes a penalty function 202, the prediction model 112, an objective function 214, a graphical user interface (GUI) engine 212, and a collection engine 216. The components of the model training tool 210 may represent modules that may be combined together or separated into further modules, according to some embodiments. The model training tool 210 may include more or less components than those depicted in FIG. 2.

Before the model training tool 210 is used to perform any given round of training on the prediction model 112, the collection engine 216 may collect data from the training dataset 230. The dataset 230 may include predicted data 232 and actual performance data 234. The predicted data 232 may be data that was generated for a candidate in an effort to predict a performance value for the candidate. The actual performance data 234 may include data that was generated for the candidate after hiring and establishing a record of the candidate's actual performance after hiring from which an actual performance value may be obtained. The collection engine 216 may collect the predicted data 232 separate from the actual performance data 234 or may collect the predicted data 232 and the corresponding actual performance data 234 in approximately the same action. The training dataset 230 may also be a corrected dataset as described herein, have adaptation or modification to the training dataset for any given interviewee or candidate. The collection engine 216 may provide the training dataset 230 to the objective function 214. The collection engine 216 may also provide the training dataset 230 to the penalty function 202.

In some embodiments, the objective function 214 and the penalty function 202 may also access one or more rules 236. The rules 236 may be stored in a data store 130 external to the model training tool 210, as illustrated, or stored local to the model training tool 210. The rules 236 may include conditions such as a requirement to meet the four-fifths (⅘ths) rule or a definition of the "statistical significance" rule. The rules 236 may be input by a user, such as an administrator of the module training tool 210. The rules 236 may also stipulate threshold difference value(s) between an original score and an altered score generated by application of a job prediction model to an original dataset and to a modified or mapped dataset, respectively. The rules 236 may further stipulate a second threshold value in terms of percentage contribution of a particular feature to the adverse impact of a particular job performance or prediction model.

The model training tool 210 may identify different features from the training dataset 230. The features may include audio features, video features, image features, an interaction feature, or a candidate submitted feature and the like. The model training tool 210 may communicate the training dataset 230 to the objective function 214. For example, the model training tool 210 may utilize facial feature detection to identify visual indicators of a candidate, such as Active Appearance Model (AAM), facial coding techniques, or other computer vision algorithms to model a face of the candidate. The model training tool 210 may identify other types of features than facial in the training dataset, such as other visual indicators, audio indicators, language indicators, speech indicators, or the like. A speech indicator may include speech-related indicators such has how a person says words, with what emphasis, is there pause or silence, and how long does an interviewee take to answer.

The objective function 214 may apply a learning scheme to the supplied dataset 230. In some embodiments, the learning scheme may be a deep learning scheme, a regression approach, a vector machine, genetic programming, or other supervised or unsupervised machine learning scheme.

In one embodiment, the objective function 214 may include a sum of squared errors (SSE) algorithm. Mathematically, the SSE may be expressed as:

$$SSE = \Sigma_{i=1}^{N} e_i^2 = \Sigma_{i=1}^{N} (y_p - y_t)^2 \quad (1)$$

where $e_i$ is defined as the difference between the predicted performance outcome values $y_p$ and actual performance outcome values $y_t$. The values in $y_p$ may be produced using:

$$y_p = f(x) \quad (2)$$

where f represents a function or algorithm used to process input features, x, such as text, audio, video, assessment results, competency scoring, candidate response, etc. However, as described above, the processed input features such as the assessment results or competency scoring may be impacted by a bias relating to a protected class of the candidates.

Correcting the adverse impact of one or more class-specific biases may be accomplished by dividing the objective function inputs into equal representations relative to the classification (race, gender, age, etc.). Without correction, the majority candidates may dominate the error metric in the above SSE. In order to prevent a majority class from defining or controlling the SSE, and therefore providing the majority model influence, the objective function 214 is redefined, in examples described herein, to be broken out by each protected class. The original SSE definition shown above is replaced with a more granular summary defined by:

$$SSE_{corrected} = \sum_{i=1}^{A} \frac{e_i^2}{A} + \sum_{i=1}^{B} \frac{e_i^2}{B} + \sum_{i=1}^{C} \frac{e_i^2}{C} + \cdots \quad (3)$$

where each candidate class is broken out and normalized by total class candidate count. Variables A, B, and C represent total counts for a particular class, such as a particular race (i.e. black, white, Hispanic, etc.), gender, or age group. This allows each candidate class to influence the model with equal weight on the objective function, ensuring that the majority class does not dominate the impact on training the model to the detriment of an underrepresented or minority class within the training dataset 230.

In the illustrated embodiment shown in FIG. 2, the model training tool 210 also includes a penalty function 202. The penalty function 202 may be incorporated to further reduce adverse impact on the predictive model 112 or to check for or remedy a specific adverse impact situation. One example of the objective function 214 with a penalty function included may be defined by:

$$SSE_{with\text{-}penalty} = SSE_{corrected} + P(X) \quad (4)$$

Here, the penalty function P(X) is not explicitly defined because it may vary based on rules and regulation for regions over time. An example of a penalty function the 4/5ths rule and is represented as follows:

$$P(X) = \begin{cases} p_m, & \text{if } f(X) \text{ violates 4/5ths rule} \\ 0, & \text{otherwise} \end{cases} \quad (5)$$

where an appropriate penalty, $p_m$, may be used to adjust the original error metric if an adverse impact is detected during the model training phase. In the above penalty function, the 4/5ths rule is applied. In this example, if any class of candidates has a hiring rate, that is less than 80% of the top class hiring rate, the 4/5ths rule is violated and a penalty value, $p_m$, may be incorporated into the objective function 214.

Other rules, such as the "statistical significance" rule, may also be used. The statistical significance rule may define other thresholds of discrepancy at which a penalty value may be incorporated. Other thresholds and rules may be applied as situations arise or legal or entity standards change. In some embodiments, multiple penalty functions 202 may be applied to the objective function 214.

The penalty $p_m$ magnitude may be defined depending on the priority of the violation. If the violation cannot be tolerated, then $p_m$ may be quite large (such as a value of 100, 1000, or even infinite). When a middle ground is possible, a smaller $p_m$ value will still allow for violation consideration without impacting a prediction performance as much as a large $p_m$ value might.

There are many different error metrics depending on the use case. This approach offers value regardless of the error metric that is used. The original $SSE_{corrected}$ in equation (3) may be rewritten in the general format of:

$$E_{corrected} = E_A + E_B + E_C + \ldots \quad (6)$$

where E represents the error term of interest and $E_A$ represents the normalized error for candidate class A. Here, E may be redefined for many different error types.

When:

$$E_A = \sum_{i=1}^{A} \frac{e_i^2}{A}, \quad (7)$$

the original expression from the $SSE_{corrected}$ equation is returned.

If E is redefined as using a Mean Absolute Error (MAE) as in equation (8) below, where:

$$E_A = \frac{1}{A} \sum_{i=1}^{A} |y_p - y_t| \quad (8)$$

the objective function 214 changes and the training of the model may be adjusted.

Another objective function example could include Logarithmic Loss or "LogLoss" defined by:

$$E_A = -\frac{1}{A} \sum_{i=1}^{A} |y_t \log(y_p) + (1 - y_t)\log(1 - y_p)| \quad (9)$$

Many different objective functions exist other than those set forth in equations (1)-(9), such as area under a receiver operating characteristics (ROC) curve (AUC), root mean square (RMSE), Nash-Sutcliff efficiency (NSE), Chi-squared, or the like. The general approach includes defining any objective function, such as a cost or loss function, where the contribution is normalized between candidate classifications with the potential for a penalty to be incorporated to address specific situations. While certain examples are described herein, the approach discussed may incorporate any number of algorithms or functions to predict and evaluate performance prediction. Possible algorithms include support vector machines, deep neural networks, various regressions, decision trees, and supervised learning variants. This allows for a number of advantages.

For example, previous approaches to address bias in a training dataset may include manually adjusting a candidate GPA to assist minority candidates. However, this approach may be seen as controversial where majority class candidates may contend the approach is an unfair discrimination against their in-school performance. A better approach may be to remove the feature, or leave the raw features alone and focus on the best objective function for the problem to protect against this concern.

In another example, previously suspect features that were not well understood were risky considerations. For example, the suspect features may be complex modeling techniques with feature creation techniques or metrics unrelated to performance. In the examples described herein, more aggressive deep learning approaches may be applied to audio, video, image, and other feature sources to predict performance without mimicking or incorporating adverse impact. Also, companies which may not have performance data may use pre-performance data such as interview screening status, hiring status (offer/no offer), or other metrics previously considered too risky.

Returning to FIG. 2, the model training tool 210 may incorporate the above described objective function 214 and the penalty function 202 to train the prediction model 112. Once trained, the candidates may be sorted and displayed to a reviewer via the GUI engine 212. The GUI engine 212 may create a GUI with input mechanisms to review the training dataset 230, the set of rules 236 for the model training tool 210, constraints or parameters on the prediction model 112, the penalty function 202 or the objective function 214, the collection engine 216, or other aspects of the model training tool 210. The GUI engine 212 may also create other user interface mechanisms to facilitate selection of rules, modification of rules, categories, data item properties, or the like. The GUI engine 212 may also provide a visual representation of the data to display to the administrator. In some embodiments, the GUI engine 212 is used when displaying the GUI on the same device in which the model training tool 210 is implemented. In another embodiment, the GUI engine 212 may be used in connection with a web server that creates and displays a webpage to be sent to another device for display. The GUI engine 212 may also generate a GUI for reviewers within the digital interviewing platform 101, such as when viewing a list of potential candidates. For example, the reviewer may view a list of candidates and activate a user interface element to activate a sorting that sorts the candidates. The GUI engine 212 then may present the sorted list of candidates by performance values predicted by the prediction model 112. The embodiments of the model training tool 210 may use data from a new candidate interview as inputs to the prediction model 112 for predicting a performance value of the new candidate.

Figure 3:
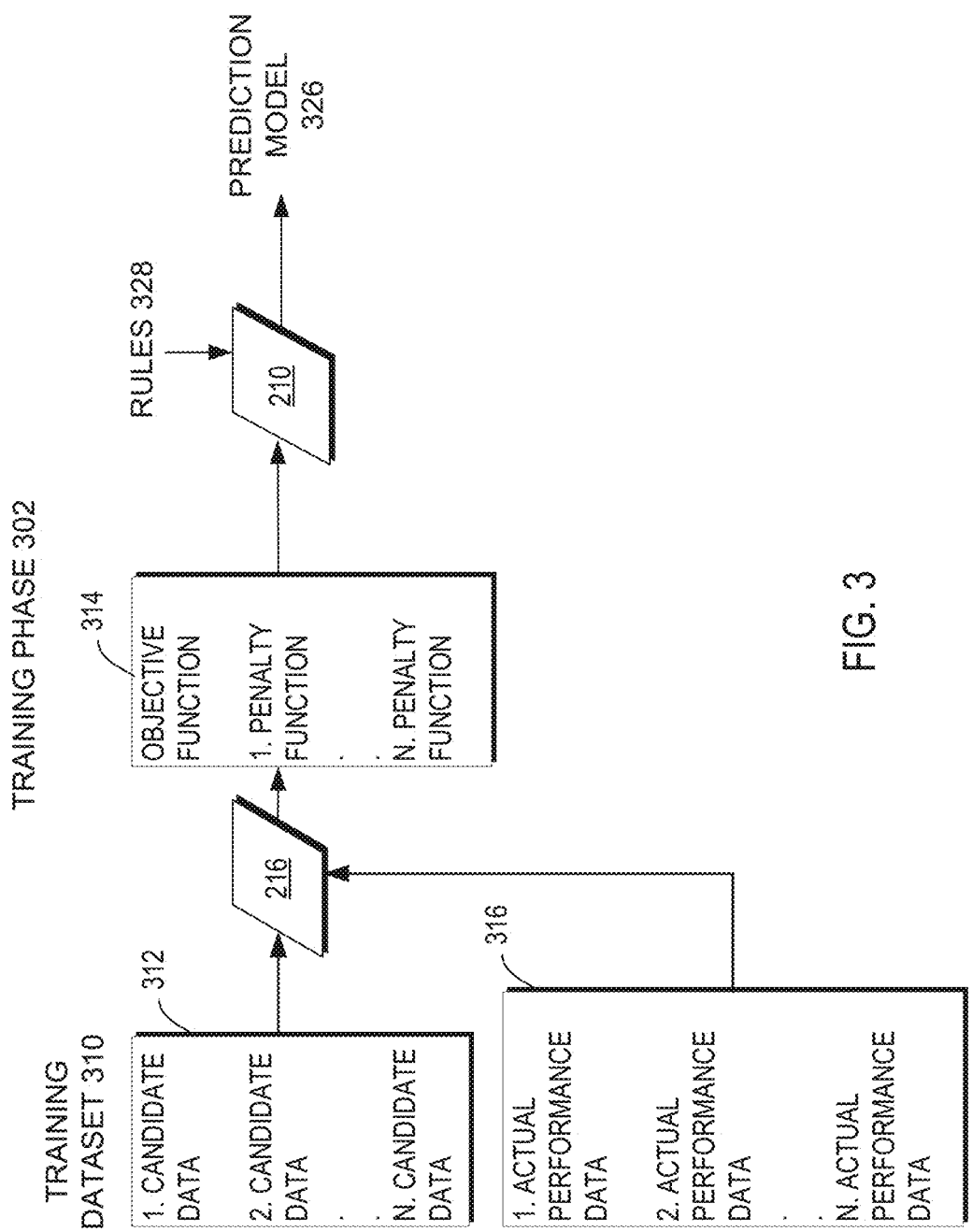
FIG. 3 illustrates a training phase of a model training tool to build a prediction model according to various embodiments.

FIG. 3 illustrates a training phase 302 of the model training tool 210 to build a prediction model 326. During the training phase 302, a training dataset 310 is identified. The training dataset includes candidate data 312 for multiple candidates. The candidate data may include audio files, video files, or other data files with information about candidates, as well as audio and/or video from the interview itself. The candidate data 312 may be captured by the digital interviewing platform 101 described herein. Alternatively, the candidate data 312 may be obtained from various sources as described herein. The candidate data 312 and performance data 316 of the training dataset 310 is collected by the collection engine 216. The training dataset 310 may be organized in columns of a matrix, where each row represents a candidate and the columns store the features corresponding to the candidate. The training dataset 310 also includes historical data 136 for the respective candidates. As described herein, the historical data 136 may be stored with the candidate data 312 or separate from the candidate data 312. Both the candidate data 312 and the performance data 316 are collected by the collection engine 216 and fed into the functions (objective and penalty) which provide values to the model training tool 210 to develop a prediction model 326. The model training tool 210 may be governed by rules 328. The rules may be input by an administrator responsible for building the prediction model 326. The rules 328 may include a set of training rules for an algorithm that builds the prediction model 326 based on the values from the functions 314 operating on the training dataset 310. Once the prediction model 326 is developed, it may be further trained by testing additional data in the training dataset 310. This may allow the administrator to adjust the set of rules 238 of the algorithm being used as well as the objective and penalty functions of the functions 314. Alternatively, the techniques described herein may be used for non-protected classes and may use unsupervised learning to build the predictive performance model.

Figure 4A:
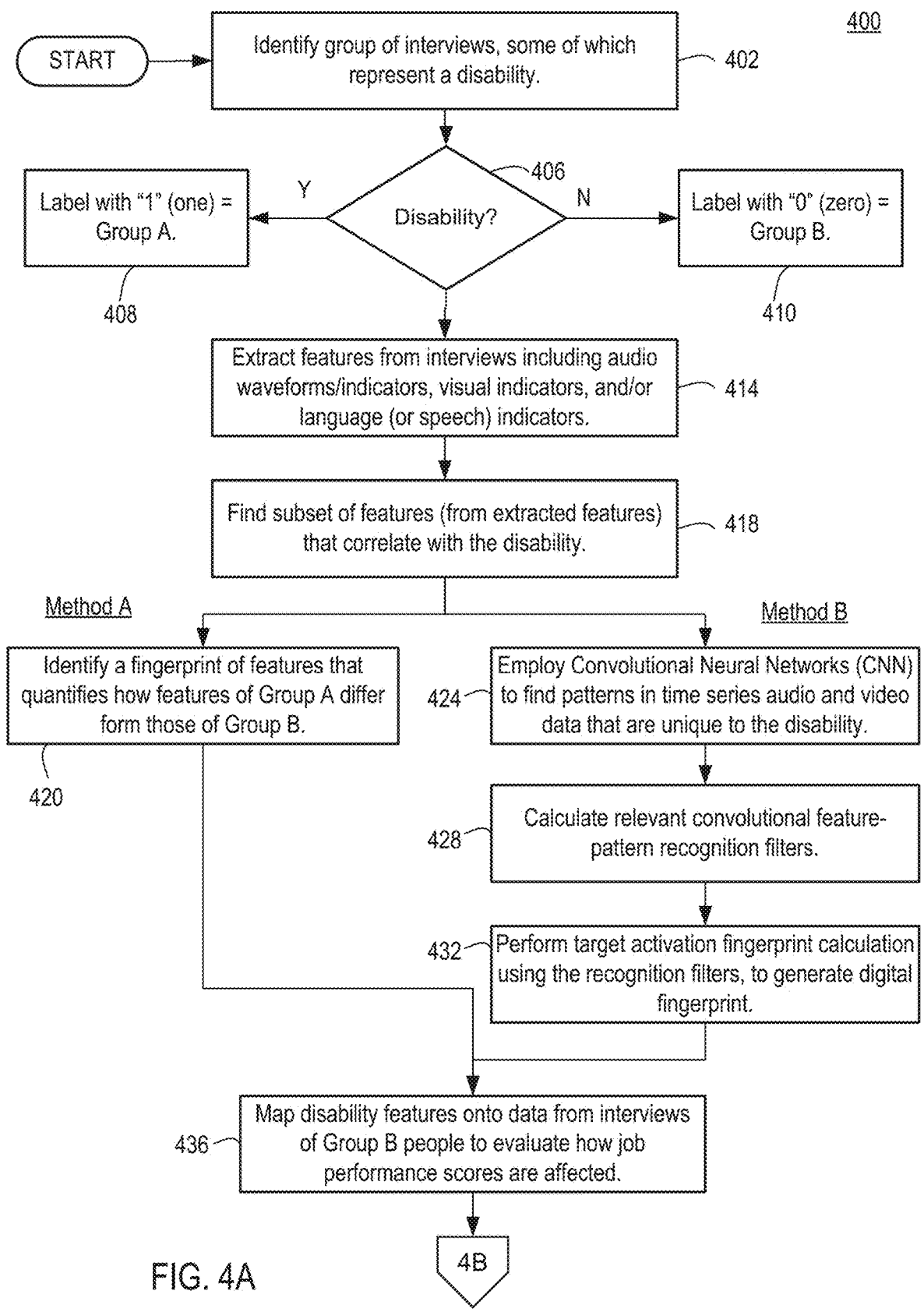
FIGS. 4A and 4B are a flow diagram of a method for identifying a disability among interview candidates and determining whether treatment of the disability by a predictive model includes an adverse impact on those who are disabled, according to various embodiments.
Figure 4B:
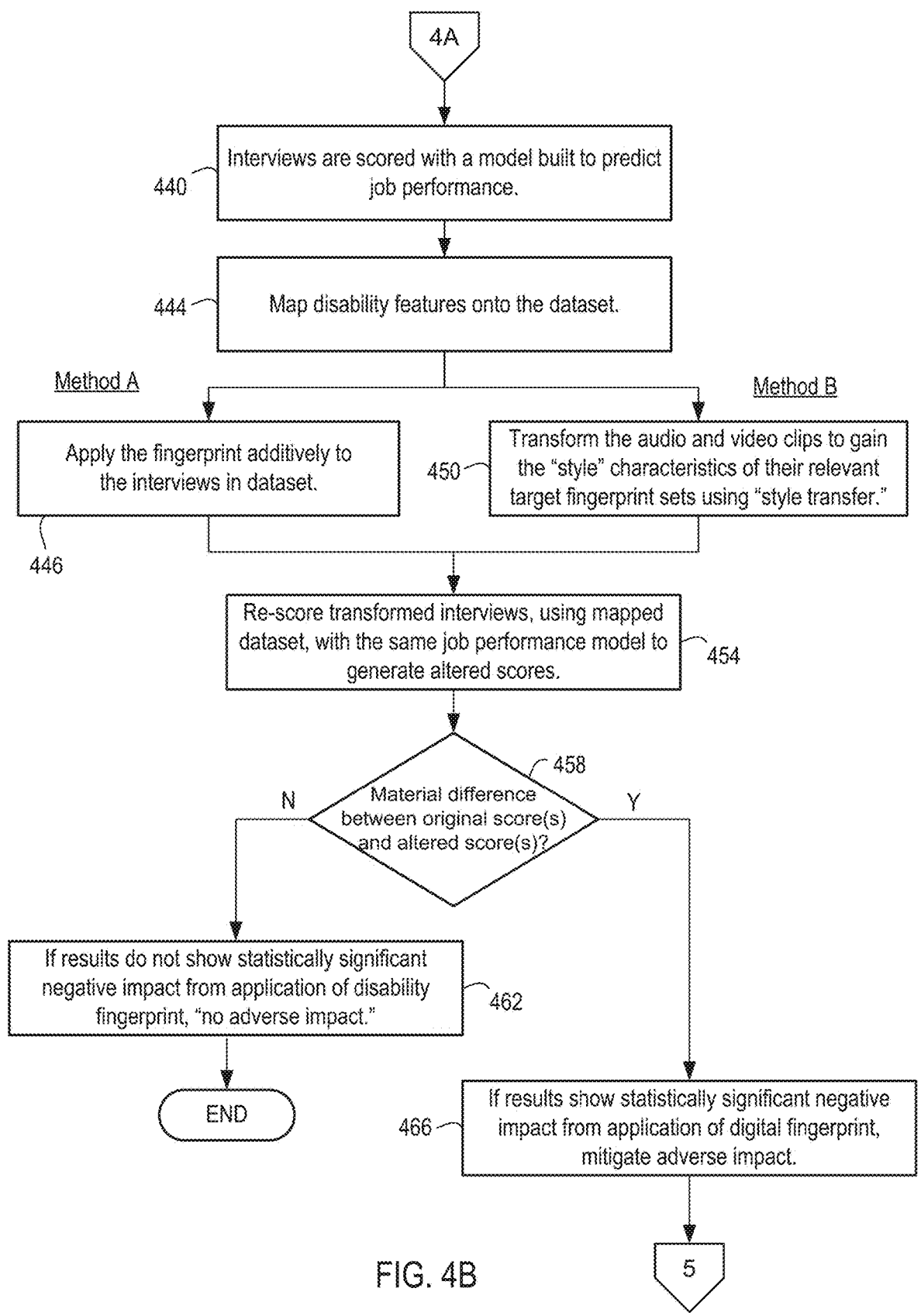

FIGS. 4A and 4B is a flow diagram of a method for identifying a disability among interview candidates and determining whether treatment of the disability by a predictive model includes an adverse impact on those who are disabled, according to various embodiments. The method 400 may be performed by processing logic comprising hardware (circuitry, dedicated logic, etc.), software (such as is run on a general purpose computing system or a dedicated machine), firmware (embedded software), or any combination thereof. In one embodiment, the processing logic of the model training tool 110 of FIG. 1 performs the method 400. In another embodiment, the processing logic of model training tool 210 of FIG. 2 performs the method 400. Alternatively, processing logic of server 104, client 102, or both performs some or all of the method 400.

With reference to FIGS. 4A and 4B, the method 400 may begin with the processing logic identifying a group of interviews, some of which represent a disability in the person being interviewed (402). The method 400 may continue with the processing logic determining, for each identified interview, whether the interviewee has a disability (406). This may be performed by the person self-identifying as disabled, e.g., through an informational form or survey during the interview process. This may also be done by extracting, from digital interview data, and detecting features (e.g., action units) associated with the disability. If the interviewee is disabled, the method 400 may continue with the processing logic labeling that interviewee with a one (or some similar indication) to group that interviewee into a Group A, e.g., those identified as disabled (408). If the interviewee is not disabled, the method 400 may continue with the processing logic labeling that interviewee with zero (or some similar indication) to group that interviewee in a Group B, e.g., those identified as not disabled (410).

The method 400 may continue with the processing logic extracting features from the interviews for which the interviewee has been identified as disabled (e.g., as belonging to Group A), the features including audio waveforms, video features, language features, audio or speech features or the like (414). For example, these features (e.g., action units) may include facial or visual indicators (e.g., how much the right corner of the mouth raises, or a blink rate, or the like), audio indicators (e.g., voice inflection, stuttering, accents), language indicators (e.g., what words are chosen, grammar structure, and the like), and speech indicators (e.g., how words are spoken, e.g., emotion or monotone, how long it takes to answer, pauses or periods of silence and the like). In one embodiment, audio and speech indicators may be combined together and labeled speech indictors. The method may continue with the processing logic finding features (from those that have been extracted) that correlate with the disability (418). If there is no muscular action on the right side of the face, the processing logic may determine the person has had a stroke, or if there are a lot of facial or verbal tics (e.g., a stutter), the processing logic may determine the person has Tourette's syndrome. This may be done with various approaches, one of which is to identify a fingerprint of the features that quantifies how features of Group A differ from those of Group B (420). This first approach may be performed according to a couple embodiments.

In a first embodiment of performing block 420, the processing logic determines the closest median-pairwise-difference vector between Group A and Group B feature clusters. For example, the processing logic may perform clustering analysis separately on Group A members and Group B members, where the special case of one cluster per group is equivalent to not clustering. The clustering may reduce each group to a collection of clusters, then look at the relationship between the most similar pairs of clusters across the groups, Group A and Group B, for example. For each cluster pair (Group A to closest Group B cluster), the processing logic may calculate pairwise difference vectors between Group A and Group B pairs of individuals, to generate a set of difference vectors. The processing logic may further calculate an element-wise median along the resulting set of difference vectors for each feature. The resulting mean or median vector of the pairwise differences between members (e.g., the different features) of the two clusters is the "fingerprint." In some embodiments, the mean of the pairwise difference vectors may be equivalent to taking the distance between cluster centroids.

In a second embodiment of performing block 420, the processing logic may perform probability distribution function matching. For example, the processing logic may calculate the probability distribution functions (histograms) for each feature (e.g., independently for Group A and Group B), and estimate a nonlinear transformation to transform Group B so that Group B and Group A have the same distribution. The processing logic may further model this transformation as a piecewise linear function interpolated on the data. This piecewise function may be the resulting "fingerprint" of relevant features for a given disability.

More specifically, the processing logic may calculate a first probability distribution function of the digital interview data for each of the features for the first group (Group A) and calculate a second probability distribution function of the digital interview data for each of the features for the second group (Group B). The processing logic may estimate a nonlinear transformation to transform the second probability distribution function to have an identical distribution as the first probability distribution function. The processing logic may model the nonlinear transformation as a piecewise linear function interpolated on the digital interview data, to generate the digital fingerprint.

The method 400 may continue with the processing logic mapping the disability features (e.g., unique to a disability of those in Group A) onto features (or dataset of features) of someone with no disability (e.g., one or more persons in Group B), and evaluate how job performance scores are affected (436). Different ways of performing this mapping are discussed with reference to FIG. 4B. In this case, the mapping at block 436 may be to change the qualities and small-scale characteristics of a person's data to be more typical of someone in the disabled class without changing the bulk of the overall content too much.

With continued reference to FIG. 4A, in an alternative approach to those embodiments discussed with reference to block 420, the method 400 may continue with the processing logic employing Convolutional Neural Networks (CNN) to find patterns in time series audio and video data (e.g., an A/V file) that are unique to the disability (424). The method 400 may continue with the processing logic calculating relevant convolutional feature-pattern recognition filters to apply to the interview data (428). This step may be performed in one of a number of ways, as follows.

In a first embodiment of performing block 428, the processing logic may implement an auto-encoder as follows. The processing logic may employ convolutional layers to produce a smaller encoded form of the input, and de-convolutional layers of the CNN to reproduce, in view of the smaller form, that input from the encoding as an output. The processing logic may then train the convolutional layers and the de-convolutional layers to minimize the difference between the input and output. Then the trained convolutional layers that perform the encoding may constitute the relevant pattern recognizers for the convolutional feature-pattern recognition filters.

With more particularity, the targeted behavior in training is to reproduce the original data from the smaller encoding and the appropriate set of weights. To accomplish this for the decoder, the learning may be performed at the same time as training the encoder's weights for producing the encoding. The convolutional layers are part of the encoder, and the de-convolutional layers are part of the decoder. In one embodiment, the goal may be to minimize how much distinctive information is lost in the process of reducing the original input data into the smaller encoded form. This loss may be measured by how well the decoder can reconstruct the input from just the encoding.

In a second embodiment of performing block 428, the processing logic may perform generative adversarial network (GAN). To do so, the processing logic may create a de-convolutional generator network that synthesizes audio/video (A/V) data given a disability label. The processing logic may further pair the de-convolutional generator network with a discriminator convolutional network that attempts to distinguish whether the synthesized A/V data is genuine, given the disability label. The processing logic may then train the de-convolutional generator network to force the discriminator convolutional network into assessing the output as genuine rather than synthesized. The processing logic may further train the discriminator convolutional network to distinguish genuine from synthesized A/V samples. A set of convolutional layers within the trained discriminator network may constitute the relevant pattern recognizers for the convolutional feature-pattern recognition filters.

In a third embodiment of performing block 428, the processing logic may employ a convolutional classifier. To do so, the processing logic may train a convolutional neural network (CNN), to include fully-connected layers of the CNN, to distinguish whether an A/V sample is from a person with the disability. The convolutional layers in the trained CNN may constitute the relevant pattern recognizers for the convolutional feature-pattern recognition filters.

With continued reference to FIG. 4A, the method 400 may continue with the processing logic performing target activation fingerprint calculations, for a given A/V sample output (of the digital interview data to be modified), using the convolutional feature-pattern recognition filters to identify a digital fingerprint (432). To do so, the processing logic may pass a number of audio or video samples of people with a given disability through the convolutional filters and record the activation outputs. The processing logic may then cluster the resulting output vectors. The special case of one cluster is equivalent to not clustering. The processing logic may then calculate an aggregated, per-filter activation across each cluster (which may be maximum, mean, median, and the like). For any sample of audio or video to be modified, the processing logic may calculate the convolutional filter activation output. The processing logic may determine which fingerprint cluster activation output is closest to the sample activation output. That is now the digital fingerprint for this sample output. The term "activation" in a neural network may refers to how "lit up" a "neuron" is, e.g., a discrete computational node within the neural network.

The method 400 may continue with the processing logic mapping the disability features (e.g., unique to a disability of those in Group A) onto features of someone with no disability (e.g., one or more persons in Group B), and evaluate how job performance scores are affected (436). Setting this level of activation helps keep large-scale features of the data, while allowing for modification of small-scale features. In this case, the mapping at block 436 is to change the qualities and small-scale characteristics of a person's data to be more typical of someone in the disabled class without changing the bulk of the overall content too much.

Because the various fingerprint methods quantitatively characterize the differences between Group A and Group B members as they appear in the data, those differences can be applied to Group B members to make them more similar to Group A, or vice versa. Then the scores before and after the change can be compared, and the impact of different fingerprint traits on the evaluated performance scores evaluated. For instance, if one of the extracted data points is the frequency of eye blinking, and it is found that Group A members blink more often Group B members, we can take Group A members and replace the blinking frequency data with values more typical of Group B and see how that affects the performance scoring, if any.

With reference to FIG. 4B, the method 400 may continue with the processing logic scoring interviews with a model built to predict job performance (440). The method 400 may continue with the processing logic mapping disability features (e.g., using feature identifiers or the like) onto a dataset of one or more people from Group B (e.g., those that don't have the disability), to generate a mapped dataset (444). This mapping may be performed in one of at least two ways. In one embodiment, the processing logic may apply the fingerprint additively to the interviews in the dataset (446). This transformation in the feature space can make each interview look more like the closest Group A (disability) cluster, effectively giving those candidates the disability. In another embodiment, the processing logic may transform the audio and video clips (e.g., clips of interviews) to gain the "style" characteristics of their relevant target fingerprints sets by applying a method known as style transfer (or style reconstruction) in a new way (450).

The style transfer may be performed starting with noise in the format of the audio or video, and iteratively altering the data to give the dataset both the content of the original data and the "style" (temporally and spatially local characteristics) that matches the activations of the digital fingerprint, e.g., via style reconstruction. Convolutional Neural Networks (CNNs), introduced earlier, include small computational units that process interview data, including visual and/or audio information, hierarchically in a feed-forward manner. Each layer of units may be understood as a collection of data filters, each of which extracts a certain feature from the input data. Thus, the output of a given layer includes so-called feature maps: differently filtered versions of the input data.

When CNNs are trained on object recognition, the CNNs develop a representation of the dataset that makes object information increasingly explicit along the processing hierarchy. Therefore, along the processing hierarchy of the network, the input dataset is transformed into representations that increasingly care about the actual content of the dataset compared to its detailed feature values (e.g., visual features, audio features, and language features). One may directly visualize the information each layer contains about the input dataset by reconstructing the dataset only from the feature maps in that layer. Higher layers in the network capture the high-level content in terms of objects and their arrangement in the input dataset, but do not constrain the exact feature values of the reconstruction. In contrast, reconstructions from the lower layers may simply reproduce the exact feature values of the original dataset. One may, therefore, refer to the feature responses in higher layers of the network as the content representation.

To obtain a representation of the style of an input dataset, one may use a feature space originally designed to capture texture information. This feature space is built on top of the filter responses in each layer of the network. The features space may thus include the correlations between the different filter responses over the spatial extent of the feature maps. By including the feature correlations of multiple layers, one may obtain a stationary, multi-scale representation of the input dataset, which captures its texture information but not the global arrangement. This multi-scale representation may be referred to as style representation.

The style transfer may be generated on the basis of a very deep convolution (VGG) network, a CNN that rivals human performance on a common visual object recognition benchmark task 23. One may use the feature space provided by the 16 convolutional and 5 pooling layers of the 19-layer VGG Network. The model is publicly available and may be explored in the caffe-framework. For image synthesis we found that replacing the max-pooling operation by average pooling improves the gradient flow and one obtains slightly more appealing results, which is why the images shown were generated with average pooling.

Generally, each layer in the VGG network defines a non-linear filter bank whose complexity increases with the position of the layer in the network. Hence, a given input dataset $\vec{x}$ is encoded in each layer of the CNN by the filter responses to that dataset. A layer with $N_l$ distinct filters has $N_l$ feature maps each of size $M_l$, where $M_l$ is the height times the width of the feature map.

So the responses in a layer, l, may be stored in a matrix $F_{ij}^l \in R^{N_l \times M_l}$ where $F_{ij}^l$ is the activation of the ith filter at position j in layer l. To visualize the image information that is encoded at different layers of the hierarchy, one may perform gradient descent on a white noise dataset to find another dataset that matches the feature responses of the original dataset. So let $\vec{p}$ and $\vec{x}$ be the original image and the dataset that is generated and $P^l$ and $F^l$ their respective feature representation in layer, l. We then define the squared-error loss between the two feature representations $$\mathcal{L}_{content}(\vec{p}, \vec{x}, l) = \tfrac{1}{2} \Sigma_{ij} (f_{ij}^l - P_{ij}^l)^2. \tag{10}$$

The derivative of this loss with respect to the activations in layer l equals $$\frac{\partial \mathcal{L}_{content}}{\partial F_{ij}^l} = \begin{cases} (F^l - P^l)_{ij} & \text{if } F_{ij}^l > 0 \\ 0 & \text{if } F_{ij}^l < 0. \end{cases} \tag{11}$$

from which the gradient with respect to the dataset $\vec{x}$ may be computed using standard error back-propagation. Thus one may change the initially random image $\vec{x}$ until it generates the same response in a certain layer of the CNN as the original dataset $\vec{p}$.

On top of the CNN responses in each layer of the network one may build a style representation that computes the correlations between the different filter responses, where the expectation is taken over the spatial extent of the input dataset. These feature correlations are given by the Gram matrix $G_{ij}^l \in \Re^{N_l \times N_l}$, where $G_{ij}^l$ is the inner product between the vectorized feature map i and j in layer l.

$$G_{ij}^l = \Sigma_k F_{ik}^l F_{ij}^k. \tag{12}$$

To generate a texture that matches the style of a given dataset, one may use gradient descent from a white noise dataset to find another dataset that matches the style representation of the original dataset. This is done by minimizing the mean-squared distance between the entries of the Gram matrix from the original dataset and the Gram matrix of the dataset to be generated. So let $\vec{a}$ and $\vec{x}$ be the original dataset and the dataset that is generated and $A^l$ and $G^l$ their respective style representations in layer l. The contribution of that layer to the total loss is then $$E_l = \frac{1}{4N_l^2 M_l^2} \sum_{ij} (G_{ij}^l - A_{ij}^l)^2 \tag{13}$$

and the total loss is $$\mathcal{L}_{style}(\vec{a}, \vec{x}) = \sum_{l=0}^{L} \omega_l E_l \tag{14}$$

where $w_l$ are weighting factors of the contribution of each layer to the total loss. The derivative of $E_l$ with respect to the activations in layer l may be computed analytically:

$$\frac{\partial E_l}{\partial F_{ij}^l} = \begin{cases} \frac{1}{N_l^2 M_l^2} ((F^l)^T (G^l - A^l))_{ij} & \text{if } F_{ij}^l > 0 \\ 0 & \text{if } F_{ij}^l < 0. \end{cases} \tag{15}$$

The gradients of $E_l$ with respect to the activations in lower layers of the network may be readily computed using standard error back-propagation. To generate the datasets that mix the content of a video with the style of a fingerprint, one may jointly minimize the distance of a white noise dataset from the content representation of the video in one layer of the network and the style representation of the fingerprint in a number of layers of the CNN. So let $\vec{p}$ be the dataset and $\vec{a}$ be the fingerprint. The loss function that is minimized is $$\mathcal{L}_{total}(\vec{p}, \vec{a}, \vec{x}) = \alpha \mathcal{L}_{content}(\vec{p}, \vec{x}) + \beta \mathcal{L}_{style}(\vec{a}, \vec{x}) \tag{16}$$

where α and β are the weighting factors for content and style reconstruction respectively.

With continued reference to FIG. 4B, the method 400 may continue with the processing logic re-scoring transformed interviews (e.g., using the mapped dataset or a modified dataset) with the same predictive performance model to generate altered scores (454). The method 400 may continue with the processing logic determining whether there is a material difference between the original scores and the altered scores, e.g., by determining that the difference between the two scores is greater than a threshold difference value (458). If there is not material difference, the method 400 may continue with the processing logic may conclude there has been no adverse impact due to the lack of a statistically significant negative impact from application of the digital fingerprint, and the method 400 may terminate (462). Alternatively, in response to the difference not being a material difference, the processing logic may provide a result of no adverse impact to a client computer via one of a mobile device application and a web browser user interface. If, however, there is a material difference (e.g., the results show statistically significant negative impact from application of the digital fingerprint to interviewee), the method 400 may continue with mitigating the adverse impact as illustrated in FIG. 5 (466).

In various embodiments, the threshold difference value may be set such that the threshold difference value corresponds to a portion of a fraction of a leading hiring rate of classes of candidates that are most frequently hired. The threshold difference value may be intended to gap between top hiring percentages and dropping below a particular threshold percentage, such as 80% of hiring rate or according to the ⅘ths rules in terms of adverse impact. In this way, mapping disability features from the first group (Group A) to those features of the second group (Group B), may facilitate determining whether the disability features have an adverse impact on a job performance (or prediction) model that is applied to the original dataset and the modified (or mapped) dataset.

Figure 5:
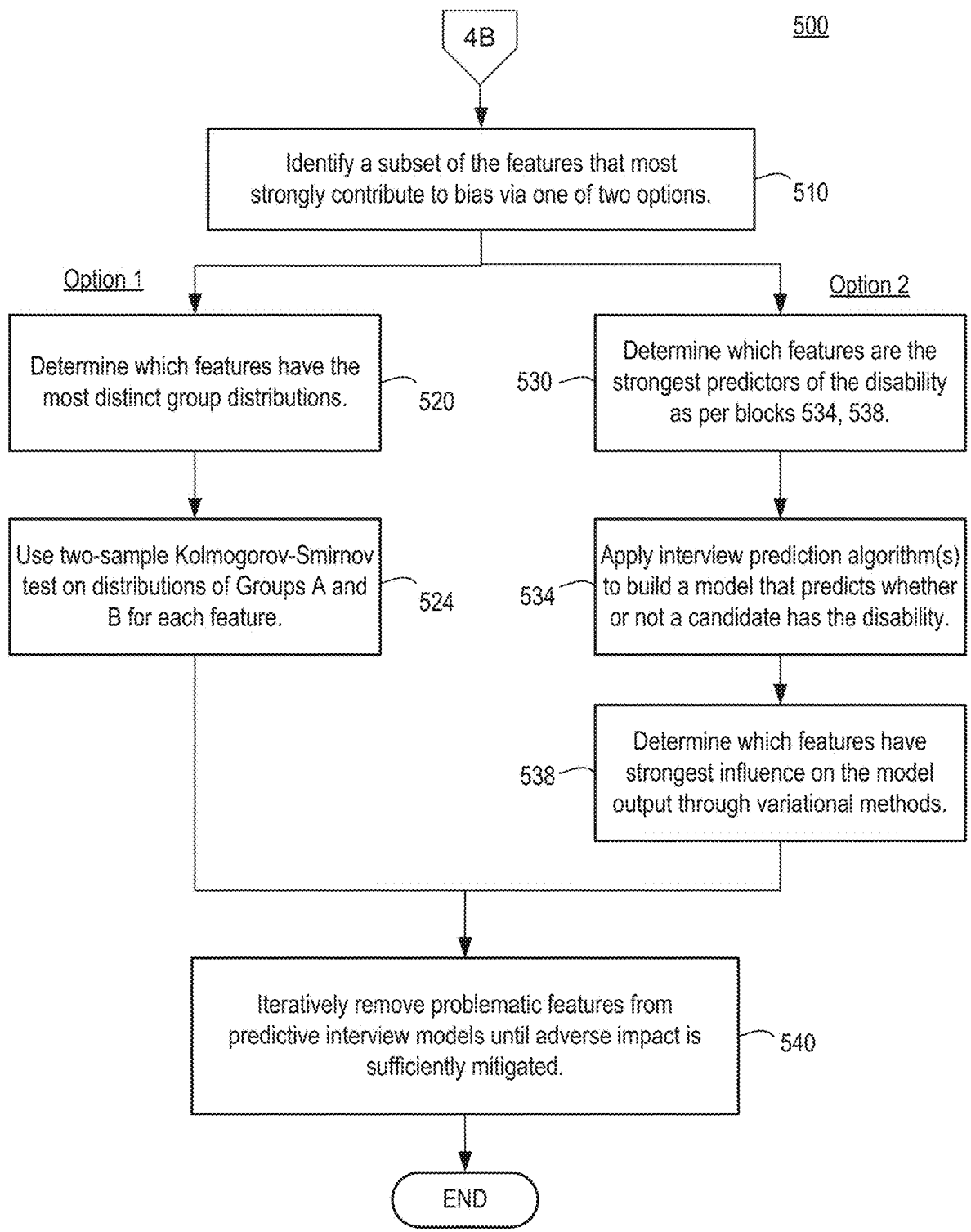
FIG. 5 is a flow diagram of a method for mitigating adverse impact of a disability, according to various embodiments.

FIG. 5 is a flow diagram of a method 500 for mitigating adverse impact of a disability, according to various embodiments. The method 500 may be performed by processing logic comprising hardware (circuitry, dedicated logic, etc.), software (such as is run on a general purpose computing system or a dedicated machine), firmware (embedded software), or any combination thereof. In one embodiment, the processing logic of the model training tool 110 of FIG. 1 performs the method 500. In another embodiment, the processing logic of model training tool 210 of FIG. 2 performs the method 500. Alternatively, processing logic of server 104, client 102, or both performs some or all of the method 500.

With reference to FIG. 5, the method 500 may begin with the processing device identifying a subset of the features that most strongly contribute to bias via one of two options (510). For example, in one embodiment, to strongly contribute to the bias, the feature is a significant contributor to meeting the threshold difference value at block 458 (FIG. 4B). In a first embodiment (Option 1), the method 500 may continue with the processing logic determining which features have the most distinct group distributions between the first group and the second group (520). Option 1 may further include the processing logic using a two-sample Kolmogorov-Smirnov test on distributions of Groups A and B for each feature (524).

More particularly, some features may exhibit patterns that are distinctive of one group as compared to the other. The "distribution" may entail information such as Group B generally has values in this feature the 0.4-0.6 range, while Group A has values in the 0.2-0.5 range. This significant non-overlap in their patterns makes this feature indicative of disability. Use of the Kolmogorov-Smirnov can quantify this distinctiveness for continuous distributions.

In a second embodiment (Option 2), the method 500 may continue with the processing logic determining which features are the strongest predictors of the disability, e.g., by varying the input features one by one and measuring the impact on predictions as detailed in blocks 534 and 538 (530). The method 500 may continue with the processing device applying at least one interview prediction algorithm to build a disability prediction model that predicts whether or not a candidate has the disability (534). The interview prediction algorithm may be a model that takes as input the feature data for the candidates and predicts given traits based on a provided set of labeled candidates. In this case, the system may directly predict whether the candidate is disabled, for example. The method 500 may continue with the processing logic determining which features have the strongest influence on an output of the disability prediction model through variational methods (538). These variational methods may include, e.g., systematically varying input features to the disability prediction model and evaluating the resulting prediction changes based on respective varied input features (538).

After performing one of the two options, the method 500 may continue with iteratively removing problematic features (e.g., individual features of a subset of the features) from predictive interview models until the adverse impact is sufficiently mitigated (538). The adverse impact may be sufficiently mitigated when, for example, the difference between the original score and the altered score falls below the threshold difference value.

In general when performance prediction models are built on video interviews, if the training data is not inherently biased and has ample representation of people with disabilities, then those with disabilities will be treated fairly. In other words, if we have 100 people with Tourette's syndrome and the ratio of top/bottom performers is the same as that of the general population (say 50/50), then the predictive model should reflect the same mixture, e.g., there is no group difference in performance between people with the disability and people without. However, many models do not have enough examples of people with disabilities for this to occur. With a small representation of disabilities, we want to ensure that the associated traits are not strongly tied to either high or low performance in the model. The present disclosure provides a way to identify whether the disclosed system and method are using the features that represent the disability to disadvantage candidates. It may be applied to a multitude of disabilities and allows correction of any impact that is found so that all groups may be treated equally.

Figure 6:
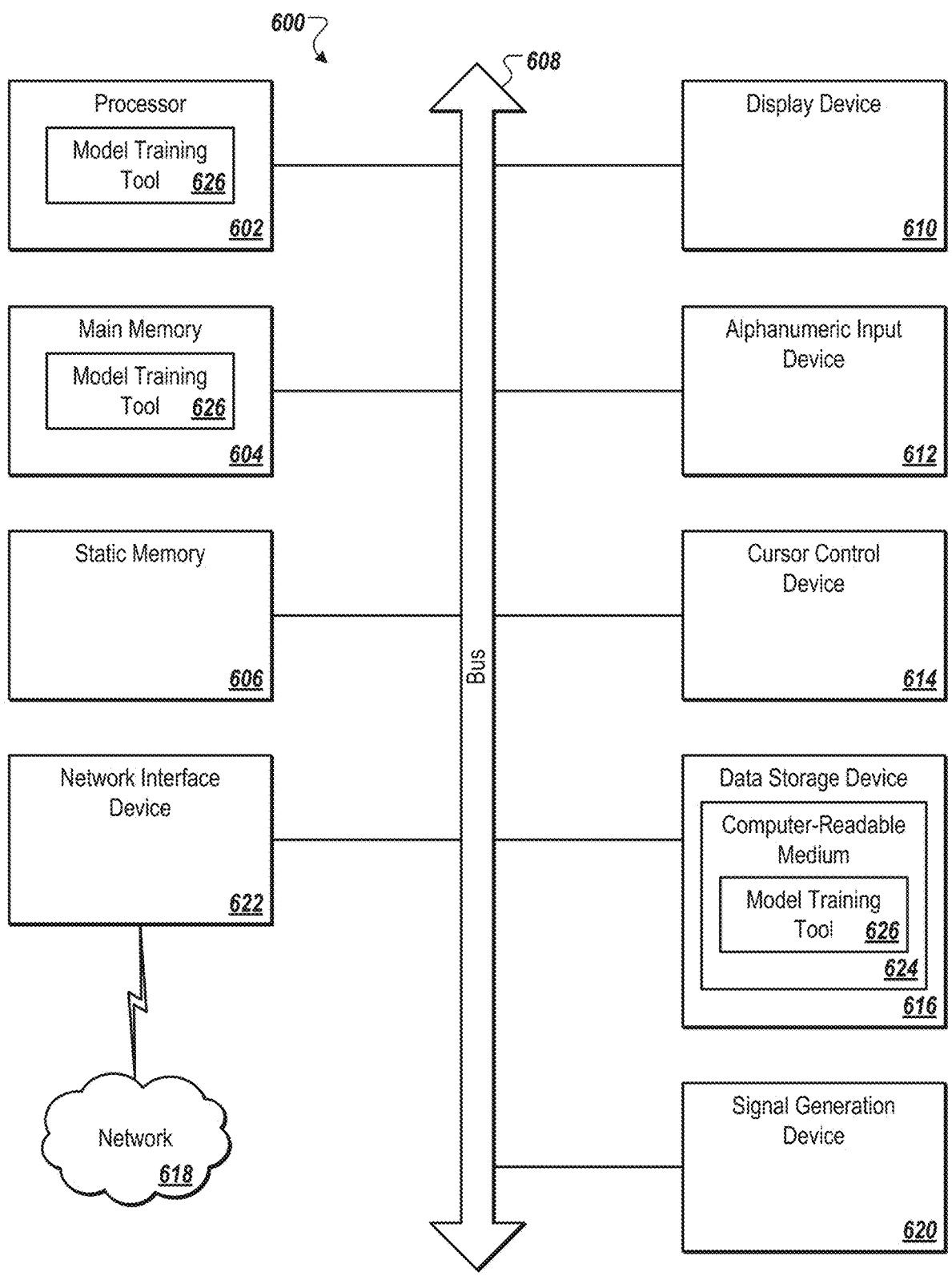
FIG. 6 illustrates a diagrammatic representation of a machine in the example form of a computing system for training a predictive model.

FIG. 6 illustrates a diagrammatic representation of a machine in the example form of a computing system 600 for training a predictive model. Within the computing system 600 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for a model training tool for evaluating digital interviews and the like, such as the method 400 described above. In one embodiment, the computing system 600 represents various components that may be implemented in the server computing system 104 as described above. Alternatively, the server computing system 104 may include more or less components as illustrated in the computing system 600.

The exemplary computing system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 616, each of which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic or instructions (e.g., model training tool 626) for performing the operations and steps discussed herein.

The computing system 600 may further include a network interface device 622. The computing system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored one or more sets of instructions (e.g., model training tool 626) embodying any one or more of the methodologies or functions described herein. The model training tool 626 may also reside, completely or at least partially, within the main memory 604 and/or within the processing device 602 during execution thereof by the computing system 600, the main memory 604 and the processing device 602 also constituting computer-readable storage media. The model training tool 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The model training tool 626, components, and other features described herein may be implemented as discrete hardware components or integrated in the functionality of hardware components such as ASICS, FPGAs, DSPs, or similar devices. The model training tool 626 may implement operations of performance model adverse impact correction as described herein. In addition, the model training tool 626 may be implemented as firmware or functional circuitry within hardware devices. Further, the model training tool 626 may be implemented in any combination hardware devices and software components.

Figure 7:
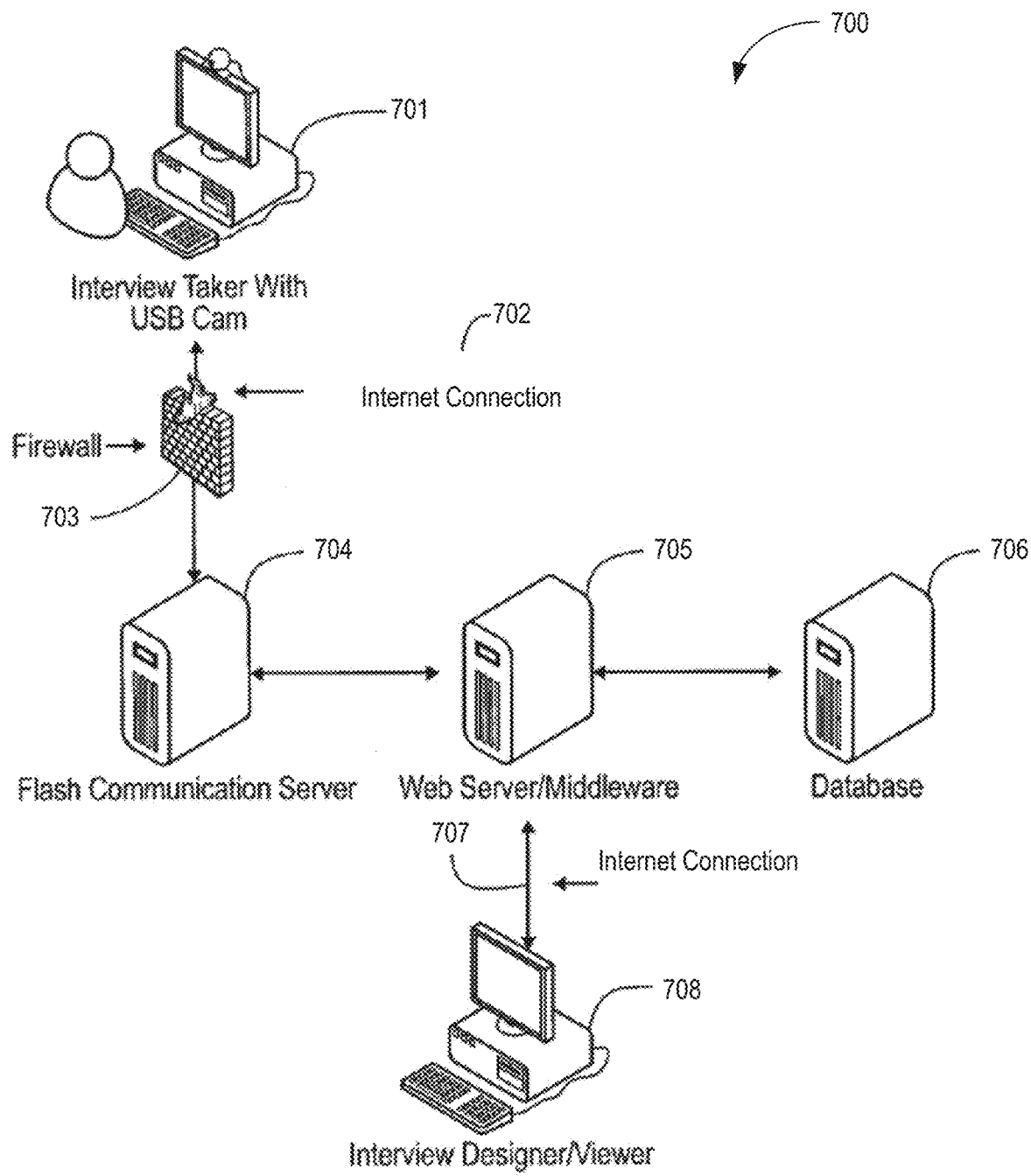
FIG. 7 illustrates a diagrammatic representation of a network architecture in which embodiments of training a predictive model may operate.

FIG. 7 is a block diagram of a network architecture 700 in which embodiments of a model training tool 110 may operate. The network architecture 700 may be used in the design of one or more digital interactions and conducting one or more of the interactions. The administrator of the digital platform may use a standard computer system 708 with an Internet connection 707 (or other network connection) to a web server 705 (also referred to as middleware server). The web server 705 includes the model training tool 110 as described herein. In this embodiment, the model training tool 110 resides on the web server 705 and the web server 705 is in communication with a database 706 (e.g., data store 130) as well as with, in this example, a communication server 704, such as a Flash communication server to facilitate communication with a user or subject such as an interviewee. The communication server 704 communicates with the interviewee typically over an Internet connection 702 (e.g., a public or private network connection). A firewall 703 may be used to protect the security of the servers 704, 705 and the database 706. The interviewee, using a computer system with a web camera 701 interfaces over the Internet connected to answer questions, upload information, and conduct one or more interviews. The computer systems used by the administrator computer 708 and the interviewer computer 701 may be various types of computers, user devices, or other types of devices that are network compatible and include a web camera, a microphone, or any combination thereof to record the digital interview. The candidate data, including the recording of the digital interview are stored in the database 706. For example, a video file, an audio file, textual data, or any combination of the digital interview may be captured by the communication server 704 (or web server 705) and stored in the database 706.

Figure 8:
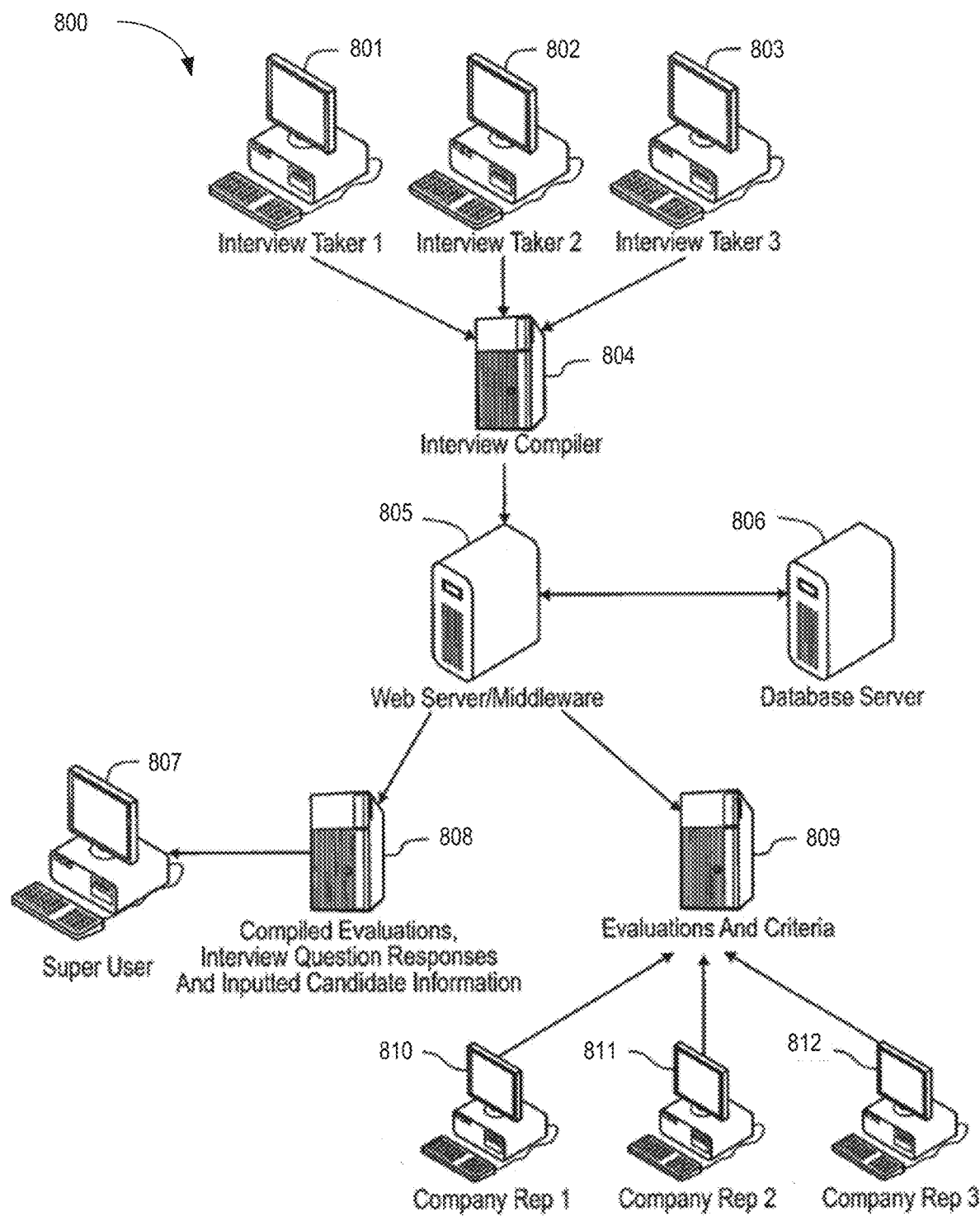
FIG. 8 illustrates a diagrammatic representation of another network architecture in which embodiments of training a predictive model may operate.

FIG. 8 is a block diagram of another network architecture 800 in which embodiments of a model training tool 110 may operate. The network configuration 600 may be used in the design of one or more digital interviews and conducting one or more interviews. In this embodiment, one or more interviewees access an interview computer 804 using networked personal computers 801, 802, 803. The interview compiler 804 is connected over a network connection to a web server 805, where the model training tool 110 may reside. The interview compiler 804 may compile responses to particular questions and allow the server 805 to match up responses with questions of an interview. The web server 805 is connected to the database server 806, where the stored data resides. The web server 805 may be accessed by an administrator (or super user), using a personal computer 807 that is connected to a storage server 808, which may store such information as compiled evaluations, interview question responses and inputted candidate (interviewee) information. One or more reviewers, using networked personal computers 810, 811, 812 may be connected to an evaluation storage server 809, which may store information on evaluations and criteria in the interview processes described herein. The model training tool 110 may reside in the web server 805 or the evaluation storage server 809 to monitor for and correct adverse impact in the decision-making process as described above.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A server comprising:
   a computer storage to store digital interview data of a plurality of interviewees captured during a plurality of interviews and to store a predictive performance model, the digital interview data comprising audio and video content from digital recordings of the plurality of interviews; and a processing device coupled to the computer storage, the processing device to:
  extract action units from the digital interview data that are associated with a disability, wherein the action units comprise a combination of visual indicators, to include facial features, language indicators, to include choice of words, and speech indicators, to include how the words are spoken;
  identify, based on the action units extracted from the digital interview data, a subset of the plurality of interviewees that have the disability;
  label, based on the subset, a first group of the plurality of interviewees as disabled and a second group of the plurality of interviewees as not disabled;
  identify features comprising the action units extracted from the digital interview data that are associated with the first group;
  formulate a digital fingerprint of the features that quantifies how the first group differs from the second group with reference to the disability, wherein the digital fingerprint comprises one of a mean or a median vector of a pairwise difference between the action units of the first group and the second group;
  map the digital fingerprint onto a dataset of an interviewee belonging to the second group of the plurality of interviewees, to generate a mapped dataset that correlates the features to individual values within the dataset, wherein the dataset includes at least one of actual or predicted performance values of the interviewee;
  quantify, via application of the predictive performance model to the mapped dataset, effects of the digital fingerprint on a job performance score for the interviewee;
  determine that a difference in the job performance score, due the digital fingerprint being mapped onto the dataset, results in an adverse impact; and
  update the predictive performance model by removing, from the predictive performance model, at least some of the features that correlate with the disability, to reduce the adverse impact in application of the predictive performance model to review of the plurality of interviewees.

2. The server of claim 1, wherein the action units further comprise audio indicators.

3. The server of claim 1, wherein to formulate the digital fingerprint, the processing device is to determine a closest, median-pairwise-difference vector of the digital interview data between first feature clusters of the first group and second feature clusters of the second group.

4. The server of claim 1, wherein to formulate the digital fingerprint, the processing device is to:
  identify features comprising the action units extracted from the digital interview data associated with the second group;
  calculate a first probability distribution function of the digital interview data for each of the features for the first group;
  calculate a second probability distribution function of the digital interview data for each of the features for the second group;
  estimate a nonlinear transformation to transform the second probability distribution function to have an identical distribution as the first probability distribution function; and
  model the nonlinear transformation as a piecewise linear function interpolated on the digital interview data, to generate the digital fingerprint.

5. The server of claim 1, wherein to map the digital fingerprint onto the dataset of an interviewee, the processing device is to apply feature identifiers of the digital fingerprint additively to interviews of the dataset.

6. The server of claim 1, wherein to map the digital fingerprint onto the dataset of an interviewee, the processing device is to transform audio/video (A/V) clips of interviews stored within the dataset to gain a style of the digital fingerprint by using style reconstruction.

7. The server of claim 1, wherein to quantify how the job performance score for the interviewee is affected, the processing device is further to:
  score, using the predictive performance model to predict job performance, the interviewee in view of the dataset to determine an original score;
  score, using the predictive performance model, the interviewee in view of the mapped dataset to determine an altered score in view of mapping the digital fingerprint; and
  determine, from a difference between the original score and the altered score, whether the features that correlate with the disability impart the adverse impact to the interviewee in likelihood of being hired.

8. The server of claim 7, wherein the processing device is further to:
  determine whether the difference is a material difference comprising to determine whether the difference is greater than a threshold difference value; and
  in response to the difference being a material difference, iteratively remove problematic features from the predictive performance model until the difference is less than the threshold difference value.

9. A method comprising:
  retrieving, by a processing device, from a computer storage, digital interview data of a plurality of interviewees captured during a plurality of interviews and to store a predictive performance model, the digital interview data comprising audio and video content from digital recordings of the plurality of interviews;
  extracting, by the processing device, action units from the digital interview data that are associated with a disability, wherein the action units comprise a combination of visual indicators, to include facial features, language indicators, to include choice of words, and speech indicators, to include how the words are spoken;
  identifying, by the processing device based on the action units extracted from the digital interview data, a subset of the plurality of interviewees that have the disability;
  labeling, by the processing device based on the subset, a first group of the plurality of interviewees as disabled and a second group of the plurality of interviewees as not disabled;
  identifying features comprising the action units extracted from the digital interview data that are associated with the first group;
  formulating, by the processing device, a digital fingerprint of the features that quantifies how the first group differs from the second group with reference to the disability, wherein the digital fingerprint comprises one of a mean or a median vector of a pairwise difference between the action units of the first group and the second group;

mapping, by the processing device, the digital fingerprint onto a dataset of an interviewee belonging to the second group of the plurality of interviewees, to generate a mapped dataset that correlates the actions units to individual values within the dataset, wherein the dataset includes at least one of actual or predicted performance values of the interviewee;

quantifying, via application of the predictive performance model to the mapped dataset, effects of the digital fingerprint on a job performance score for the interviewee;

determining, by the processing device, that a difference in the job performance score, due the digital fingerprint being mapped onto the dataset, results in an adverse impact; and updating, by the processing device, the predictive performance model by removing, from the predictive performance model, at least some of the actions units that correlate with the disability, to reduce the adverse impact in application of the predictive performance model to review of the plurality of interviewees.

10. The method of claim 9, wherein the action units further comprise audio indicators.

11. The method of claim 9, wherein formulating the digital fingerprint comprises determining a closest, median-pairwise-difference vector of the digital interview data between first feature clusters of the first group and second feature clusters of the second group.

12. The method of claim 9, wherein formulating the digital fingerprint comprises:
identifying features comprising the action units extracted from the digital interview data associated with the second group;
calculating a first probability distribution function of the digital interview data for each of the features for the first group;
calculating a second probability distribution function of the digital interview data for each of the features for the second group;
estimating a nonlinear transformation to transform the second probability distribution function to have an identical distribution as the first probability distribution function; and
modeling the nonlinear transformation as a piecewise linear function interpolated on the digital interview data, to generate the digital fingerprint.

13. The method of claim 9, wherein mapping the digital fingerprint onto the dataset of an interviewee comprises applying feature identifiers of the digital fingerprint additively to interviews of the dataset.

14. The method of claim 9, wherein mapping the digital fingerprint onto the dataset of an interviewee comprises transforming audio/video (A/V) clips of interviews stored within the dataset to gain a style of the digital fingerprint using style reconstruction.

15. The method of claim 9, wherein quantifying how the job performance score for the interviewee is affected comprises:
scoring, using the predictive performance model to predict job performance, the interviewee in view of the dataset to determine an original score;
scoring, using the predictive performance model, the interviewee in view of the mapped dataset to determine an altered score in view of mapping the digital fingerprint; and determining, from a difference between the original score and the altered score, whether the features that correlate with the disability impart the adverse impact to the interviewee in likelihood of being hired.

16. The method of claim 9, further comprising:
determining whether the difference is a material difference comprising determining whether the difference is greater than a threshold difference value; and
in response to the difference being a material difference, iteratively removing problematic features from the predictive performance model until the difference is less than the threshold difference value.

17. A non-transitory computer readable storage medium including instructions that, when executed by a processing device of a computing system, cause the computing system to perform operations comprising:
retrieving, by a processing device, from a computer storage, digital interview data of a plurality of interviewees captured during a plurality of interviews and to store a predictive performance model, the digital interview data comprising audio and video content from digital recordings of the plurality of interviews;
extracting, by the processing device, action units from the digital interview data that are associated with a disability, wherein the action units comprise a combination of visual indicators, to include facial features, language indicators, to include choice of words, and speech indicators, to include how the words are spoken;
identifying, by the processing device based on the action units extracted from the digital interview data, a subset of the plurality of interviewees that have the disability;
labeling, by the processing device based on the subset, a first group of the plurality of interviewees as disabled and a second group of the plurality of interviewees as not disabled;
identifying features comprising the action units extracted from the digital interview data that are associated with the first group;
formulating, by the processing device, a digital fingerprint of the features that quantifies how the first group differs from the second group with reference to the disability, wherein the digital fingerprint comprises one of a mean or a median vector of a pairwise difference between the action units of the first group and the second group;
mapping, by the processing device, the digital fingerprint onto a dataset of an interviewee belonging to the second group of the plurality of interviewees, to generate a mapped dataset that correlates the actions units to individual values within the dataset, wherein the dataset includes at least one of actual or predicted performance values of the interviewee;
quantifying, via application of the predictive performance model to the mapped dataset, effects of the digital fingerprint on a job performance score for the interviewee;
determining, by the processing device, that a difference in the job performance score, due the digital fingerprint being mapped onto the dataset, results in an adverse impact; and
updating, by the processing device, the predictive performance model by removing, from the predictive performance model, at least some of the actions units that correlate with the disability, to reduce the adverse impact in application of the predictive performance model to review of the plurality of interviewees.

18. The non-transitory computer readable storage medium of claim 17, wherein formulating the digital fingerprint comprises determining a closest, median-pairwise-difference vector of the digital interview data between first feature clusters of the first group and second feature clusters of the second group.

19. The non-transitory computer readable storage medium of claim 17, wherein formulating the digital fingerprint comprises:
- identifying features comprising the action units extracted from the digital interview data associated with the second group;
- calculating a first probability distribution function of the digital interview data for each of the features for the first group;
- calculating a second probability distribution function of the digital interview data for each of the features for the second group;
- estimating a nonlinear transformation to transform the second probability distribution function to have an identical distribution as the first probability distribution function; and
- modeling the nonlinear transformation as a piecewise linear function interpolated on the digital interview data, to generate the digital fingerprint.

20. The non-transitory computer readable storage medium of claim 17, wherein mapping the digital fingerprint onto the dataset of an interviewee comprises transforming audio/video (A/V) clips of interviews stored within the dataset to gain a style of the digital fingerprint by using style reconstruction.

21. The non-transitory computer readable storage medium of claim 17, wherein quantifying how the job performance score for the interviewee is affected comprises:
- scoring, using the predictive performance model to predict job performance, the interviewee in view of the dataset to determine an original score;
- scoring, using the predictive performance model, the interviewee in view of the mapped dataset to determine an altered score in view of mapping the digital fingerprint; and
- determining, from a difference between the original score and the altered score, whether the features that correlate with the disability impart the adverse impact to the interviewee in likelihood of being hired.

* * * * *